United States Patent [19]

Khutoretsky et al.

[11] Patent Number: 4,862,022

[45] Date of Patent: Aug. 29, 1989

[54] ROTOR OF ELECTRIC MACHINE WITH SUPERCONDUCTING FIELD WINDING

[76] Inventors: Garri M. Khutoretsky, ulitsa. Altaiskaya, 20, kv. 5; Jury G. Tjurin, ulitsa Rudneva, 11, kv. 56; Viktor S. Yakovlev, ulitsa Basseinaya, 111, korpus 3, kv. 151; Vladimir D. Varshavsky, ulitsa Zhukovskogo, 22, kv. 45, all of Leningrad, U.S.S.R.

[21] Appl. No.: 122,250

[22] Filed: Nov. 18, 1987

[51] Int. Cl.$^4$ ........................ H02K 9/00; H02K 1/32
[52] U.S. Cl. ........................................ 310/52; 310/61
[58] Field of Search ................ 310/52, 54, 59, 61, 310/64, 261

[56] References Cited

U.S. PATENT DOCUMENTS

| | | | |
|---|---|---|---|
| 3,809,933 | 5/1974 | Sugawara et al. | 310/52 |
| 4,013,908 | 3/1977 | Weghaupt | 310/52 |
| 4,238,701 | 12/1980 | Eckels | 310/64 |
| 4,315,172 | 2/1982 | Intichar et al. | 310/64 |
| 4,339,680 | 7/1982 | Flecher et al. | 310/61 |

Primary Examiner—Patrick R. Salce
Assistant Examiner—D. L. Kebsch
Attorney, Agent, or Firm—Lilling & Greenspan

[57] ABSTRACT

The rotor of an electric machine with a superconducting field winding has a hollow support structure with the superconducting winding, enclosed in a shrouding cylinder. Formed inside the shrouding cylinder, in the support structure, is a ring header communicating with the cooling ducts for the superconducting winding. In the internal cavity of the support structure is a trough for feeding the coolant communicating with the ring header in the large tooth area by means of radial holes spaced apart along the rotor axis, which receive heat-conductors with ducts for transferring the coolant from the trough to the ring header. On the periphery of the support structure, in the portion or sector of the support structure tooth, is formed a recess communicating with the ring header and having mounted therein other heat-conducting members extending in the radial direction and thermally insulated both from the support structure and from the heat-conductors.

4 Claims, 2 Drawing Sheets

ROTOR OF ELECTRIC MACHINE WITH SUPERCONDUCTING FIELD WINDING

BACKGROUND OF THE INVENTION

1. Field of the Invention

The present invention relates to the design of a rotor of an electric machine, such as a cryo-turbogenerator, with a superconducting field winding and more specifically, to the design of an assembly for feeding the coolant into the winding cooling zone.

2. Description of the Prior Art

In the rotors of electric machines, particularly cryo-turbogenerators, the material preferably used as a superconductor in the field winding is a niobium-titanium alloy which exhibits, with large magnetic fields and large currents, a critical temperature close to the boiling point of liquid helium here used or a cooling medium, at atmospheric pressure. With temperatures in the superconducting field winding zone exceeding a critical temperature close to the boiling point of liquid helium, a quench takes place.

As the electric machine is operated, the coolant is fed to the cooling zone along the rotor axis through a duct located in, or close to, the central space of the rotor. The location of the superconducting field winding on the outer surface of the rotor support structure leads to the necessity of radial coolant transfer from the axial duct to the winding area. Now, as a result of a centrifugal compression due to adiabatic heating, the temperature of the coolant in the radial duct increases towards the rotor periphery, and at the outlet of the radial duct it exceeds the coolant temperature at its inlet by 0.5°–1° K., thereby causing the temperature margin of the superconducting field winding to be reduced, and in some cases leading to a quench.

The problem of feeding the coolant having a temperature such as to avoid the risk of losing the effect of winding superconductivity can be handled by supplying an overcooled coolant to the radial ducts, its subsequent heating therein being compensated by the overcooling temperature. The extra overcooling of the coolant at temperatures of 3°–4° K., however, makes it necessary to provide additional devices and requires an increased power consumption.

Another way of handling the problem has the advantage of cost effectiveness: it involves removal of the heat released in the coolant within the radial duct.

Known is the rotor of an electric machine with a superconducting field winding, comprising a hollow support structure with the superconducting winding disposed thereon. The internal cavity of the frame has provided therein a trough made of a high thermal conductivity material. The trough communicates, via tubes mounted in the radial holes provided within the large tooth of the support structure, with a ring-type header disposed below the shrouding cylinder. The tubes are made of a high thermal conductivity material, such as copper, having a good thermal contact with the trough and being heat-insulated from the support structure by tubes of a low thermal conductivity material, such as glass-cloth-base laminate U.S. Pat. No. 4,238,701). In the rotor described, the coolant, i.e. liquid helium, is supplied over the helium transfer coupling to the trough, and, then, along the radial tubes and through the ring header, it is fed to the field winding. The heat released within the radial duct due to centrifugal compression of liquid helium is removed through the radial tubes and the trough, being in thermal contact therewith, into the helium vapor pool in the internal cavity of the support structure.

In the course of operation of the electric machine, however, and particularly under transient conditions, an amount of heat is supplied to the ring header through the shrouding cylinder which may produce a helium countercurrent flow in the radial tubes and hence result in an increased helium temperature in the cooling zone and in a quench.

Moreover, the assembly of such rotor presents difficulties resulting from the need of welding the heat-conducting tubes to the trough to obtain a safe thermal contact, the operation being performed with a small radius and great length of the internal cavity of the support structure.

SUMMARY OF THE INVENTION

It is an object of the invention to increase the efficiency of cooling the superconducting field winding.

It is another object of the invention to enhance adaptability to manufacture, by improving the mounting and assembly conditions of the radial heat-conducting members.

A further object of the invention is to improve heat transfer within the radial ducts by means of an enlarged heat-removing surface area of the heat-conducting members.

With these and other objects in view, there is proposed a rotor of an electric machine with a superconducting field winding, comprising a hollow support structure with a superconducting winding, a shrouding cylinder enclosing the hollow support structure, a ring-type header disposed below the shrouding cylinder and communicating with the cooling ducts of the superconducting winding, a trough for supplying the coolant located within the internal cavity of the support structure and communicating with the ring header in the large tooth area by means of radial ducts spaced apart along the rotor axis and formed in first head-conducting members mounted within radial holes in the support structure and heat-insulated from the support structure by elements of a low thermal conductivity material, according to the invention, there is provided, on the periphery of the support structure in the sector thereof, a recess communicating with the ring header, having placed therein second heat-conducting members extending in the radial direction, and means for their attachment, said second heat-conducting members being thermally insulated both from the support structure and from the first heat-conducting members.

The recess provided on the support structure periphery, in the sector, wherein there are disposed the radially extended second heat-conducting members and means for their attachment, as well as heat insulation of said second heat-conducting members both from the support structure and from the first heat-conducting members, permit removal of the heat flows generated in the shrouding cylinder during operation of the electric machine, and particularly due to transients, from the radial ducts for supplying the coolant.

It is advisable to make each of the first heat-conducting members in the form of a round rod, and each heat-insulating member in the form of a tube enclosing said heat-conducting round rod, it also being advisable to have all said rods brought out with one end to the trough and with the other end, together with the heat-insulating tubes, to the recess in the sector.

The provision of the first heat-conducting members in the form of rods and of the heat-insulating members in the form of tubes and their joint bringing-out into the recess allow the rod-and-tube combination to serve as one of the elements of the attachment means, to secure the second heat-conducting members in the recess. The bringing-out of the opposite ends of the rods into the trough causes an increase in the efficiency of heat removal in the ducts in the direction from the larger radii to the smaller ones, due to developing of heat-exchange surfaces of the ends of the rods immersed into the trough.

It is advisable that the recess be formed by a through slot along the axis of the sector.

The slot extending along the axis of the sector is the most practical way of forming the recess, in terms of adaptability to manufacture.

It is also advisable that the second heat conducting members be formed by sleeves enclosing the tubes, guide slots be cut in the walls of the slot of the sector, and wedges with holes aligned with the ducts in the first heat conducting members be inserted into said guide slots, the end faces of the sleeves being heat-insulated from the base of the slot of the large tooth and from the metal wedges by spacers made from low thermal conductivity material.

Such a construction of the second heat-conducting members and their attachment means simplifies the process of assembly and disassembly of the radial coolant supply unit and ensures a reliable attachment of the rods and sleeves.

BRIEF DESCRIPTION OF THE DRAWING

These and other objects and advantages of the invention will be more apparent from the following detailed description of the preferred embodiment thereof, with reference to the accompanying drawings, wherein.

DESCRIPTION OF THE PREFERRED EMBODIMENT

Figure 1:
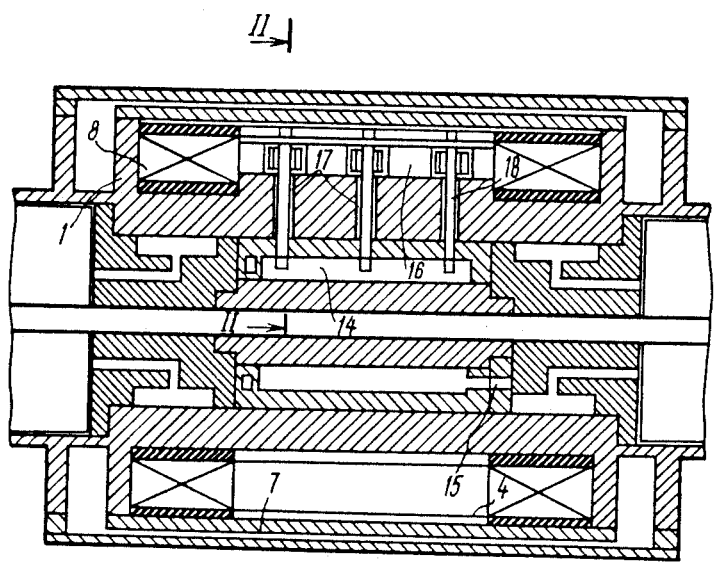
FIG. 1 is a longitudinal schematic view in cross-section of the electric machine rotor with a superconducting field winding, according to the invention.

The rotor of an electric machine comprises a metal support structure 1 (FIG. 1) having radial slots 2 (FIG. 2) with subslot channels 3 wherein a superconducting field winding 4 is placed. The winding 4 is secured within the slots 2 by wedges 5 with radial holes 6.

Figure 2:
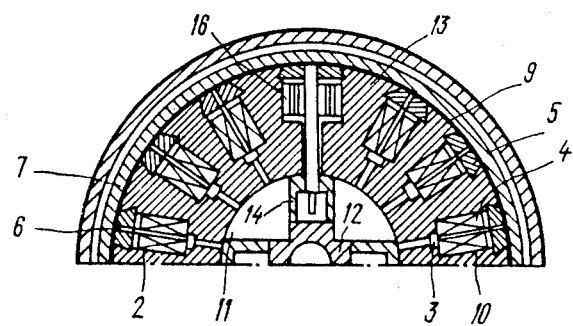
FIG. 2 is a cross-section of the rotor shown in FIG. 1 taken along the line II—II.

The support structure 1 is enclosed by a shrouding cylinder 7 which is fitted onto end portions 8 (FIG. 1) of the winding 4. Formed inside the shrouding cylinder 7 (FIG. 2), on the outer surface of the support structure 1 are annular ducts 9 serving as a ring header for distribution of the coolant, i.e. liquid helium, along cooling ducts 10 for the superconducting winding. The annular ducts 9 are inter-connected by axial ducts, not shown in the drawing for the sake of simplicity. In an internal cavity 11 of the support structure 1 is located a crosspiece 12 extending in the axial direction of the rotor, with a trough 14 formed within the body of the crosspiece below a portion or sector 13 of the support structure 1 defined by the adjacent slots 2 as it is shown in FIG. 2, the trough 14 communicating, through a duct 15 (FIG. 1), with the liquid helium source not shown in the drawings for simplicity.

A recess shaped as a wide longitudinal through slot 16 is formed in the large tooth 13. The slot 16 must be sufficiently large, its limiting size being chosen according to design.

In the large tooth 13 of the support structure 1 there are provided radial holes 17 spaced apart along the rotor axis and connecting the trough 14 with the ring header 9 through the longitudinal slot 16.

Figures 3, 4:
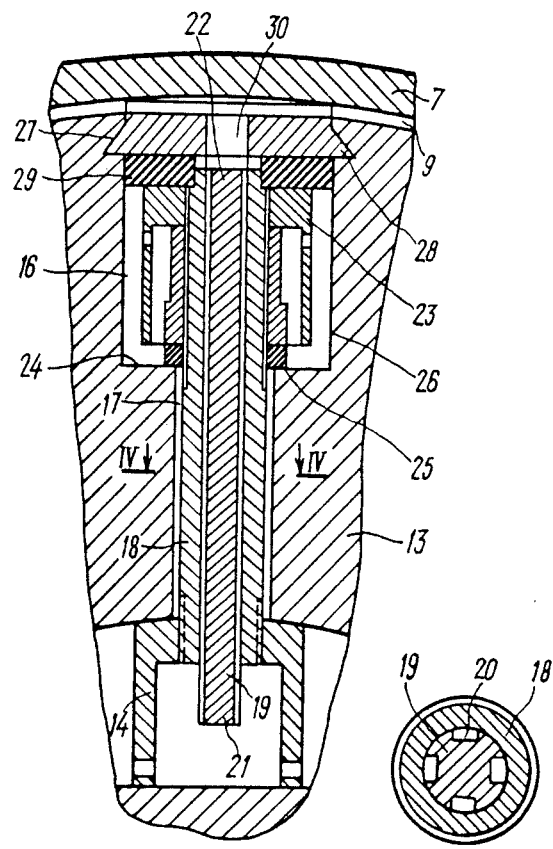
FIG. 3 is an enlarged view of a support structure 1 shown in FIG. 2.
FIG. 4 is a cross-section of the support structure shown in FIG. 3, taken along line IV—IV.

Mounted within the radial holes 17 (FIG. 3) are metal tubes 18 screwed to the trough 14 and made of a material of low thermal conductivity, when the rotor is cooled, such as titanium or nickel alloy, these tubes serving as heat-insulating members. At temperatures corresponding to those of liquid helium, the titanium and nickel alloys are known to exhibit a thermal conductivity coefficient below that of copper by three orders of magnitude. Inside the tubes 18 are mounted heat-conducting members, i.e. rods 19, made of a material such as copper and screwed to the tubes 18. The rods 19 each have, along their periphery, radial through slots 20 (FIG. 4) that serve as radial ducts for supplying liquid helium. One end 21 (FIG. 3) of each rod 19 projects into the trough 14 to such an extent that it does not enter the gaseous helium zone when the electric machine is operated.

Another end 22 of each rod 19 extends, together with the tube 18, into the slot 16 in the large tooth 13. Disposed in the slot 16 are radially extending heat-conducting members formed by sleeves 23 of a high thermal conductivity material such as copper, which enclose the tubes 18. The sleeves 23 are heat-insulated from the rods 19 by means of the tubes 18, and from a base 24 of the slot 16, i.e. from the support structure 1, they are separated by circular spacers 25 of a low thermal conductivity material such as glass-cloth-base laminate. Within walls 26 of the slot 16 are formed guide slots 27 which receive metal wedges 28 acting to hold the sleeves 23 against the base 24 of the slot 16. The sleeves 23 are heat-insulated from the wedges 28, and hence from the support structure 1, by heat-insulating circular spacers 29 made of, say, glass-cloth-base laminate. A hole 30 is made in each wedge 28, aligned with the radial slots 20 in the corresponding rod 19. The guide slots 27, the wedges 28, and the ends 22 of the rods 19 extending into the slot 16 all form, in combination with the tubes 18, the attachment means for securing the sleeves 23 within the slot 16.

During operation of the electric machine, with the rotor cooled, liquid helium supplied through the duct 15 under the action of centrifugal forces partially fills the trough 14 and completely fills the longitudinal through slots 20 in the rods 19, the slot 16 in the large tooth 13, and the annular ducts 9, from which it is fed through the holes 6 in the wedges 5 into the ducts 10 for cooling the superconducting winding 4, and then is removed through the subslot channels 3 in the slots 2.

In the radial through slot 20, under the action of centrifugal forces helium is compressed, and consequently heated. The heat released during this process is transferred, through the heat-conducting rods 19, to the fresh helium in the trough 14, which has the lowest temperature, thus causing a negligible increase in the helium temperature within the radial slots 20 at larger radii. The small increase in the helium temperature in the radial slots 20 results in a higher cooling efficiency and hence, a higher critical value of the current in the superconducting winding.

In case of short-time transients occurring during the electric machine operation, a considerably larger amount of heat penetrates to the header 9 through the shrouding cylinder 7, due to the electric losses therein, than it does under steady-state conditions. This heat is largely removed through the sleeves 23 if a high thermal conductivity material to the liquid helium-filled space near the base of the slot 16 in the large tooth 13, the space being at a lower temperature.

So, with short-time transients, the thermal in-flow to the radial ducts 20 for liquid helium supply is considerably reduced, avoiding the countercurrent flows of helium in these ducts, with the consequent increase in the cooling efficiency.

The above preferred embodiment of the invention is only taken as an example, to clarify the objects of the invention. It will be understood, that certain modifications of the embodiment disclosed hereinabove are possible within the scope of the invention as defined by the following claims.

What we claim is:

1. A rotor of an electric machine with a superconducting field winding, comprising:
    a support structure (1) having an internal cavity (11) and radial slots (2) with superconducting field winding (4) placed therein, provided with ducts (10) for cooling said superconducting winding,
    a shrouding cylinder (7) enclosing said support structure (1), said support structure (1) including a sector (13) of said support structure, having on its periphery, inside of said shrouding cylinder (7) a ring header (9) communicating with said cooling ducts (10), and also radial through holes (17) in said sector (13) spaced apart along the rotor axis and being in communication with said ring header (9), and said sector (13) having a slot (16) communicating with said header (9),
    a trough (14) for supplying the coolant, located in said internal cavity (11) of said support structure (1) and communicating with said radial holes (17),
    first heat-conducting members (19) disposed in said radial holes (17), having radial through slots (20) for feeding the coolant from said trough (14) to said header (9) and heat-insulated from said support structure by first heat-insulating members (18) of a low thermal conductivity material, so that, during operation of the machine, the heat in said radial through slots (20) can be transferred from the warmer coolant at the larger radius of said support structure (1) to the colder coolant at the smaller radius thereof,
    second heat-conducting members (23) extending in the radial direction of said support structure (1), disposed in said slot (16) and heat-insulated by spacers (25, 29) from said support structure (1) and from said first heat-insulating member, so that the heat released in said shrouding cylinder (7) can be removed from said first heat-conducting member (18), and
    means (28) for securing said second heat-conducting members in said recess.

2. The rotor of claim 1, wherein each of said first heat-conducting members (19) is formed by a round rod with a first end (21) and a second end (22), while each said first heat-insulating member of a low thermal conductivity material is formed by a tube (18) enclosing said round rod (19), said first end (21) of each said rod (19) projecting into said trough (14), and said second end (22) of each said rod (19) projecting, along with said tube (18), into said slot (16).

3. The rotor of claim 1, wherein said large tooth (13) has a through slot (16) extending along its axis, having walls (26) and a base (24) to form said slot (16).

4. The rotor of claim 3 wherein:
    each of said first heat-conducting members (19) is formed by a round rod (19) having a first end (21) and a second end (22), each said first heat-insulating member being formed by a tube (18) enclosing said round rod (19),
    said second end (22) of each said rod (19) projecting, along with said tube (18), into said slot (16),
    said second heat-conducting members (23) being formed by sleeves enclosing said second ends (22) of said rods (19) together with said tubes (18), there are formed in said walls (26) of said slot (16) guide slots (27) with metal wedges (28) inserted therein and having holes (30) aligned with said radial through slots (20) in said round rods (19),
    said guide slots (27), said wedges (28), and said second ends (22) of the round rods (19), along with said tubes (18), form, in combination, said attachment means for securing said sleeves (23), and
    said sleeves being heat-insulated by said spacers (25, 29) both from said base (28) of said slot (16) in said large tooth (13) and from said metal wedges (28).

* * * * *